I. GOTHARD.
Fruit-Picker.
No. 208,167.    Patented Sept. 17, 1878.
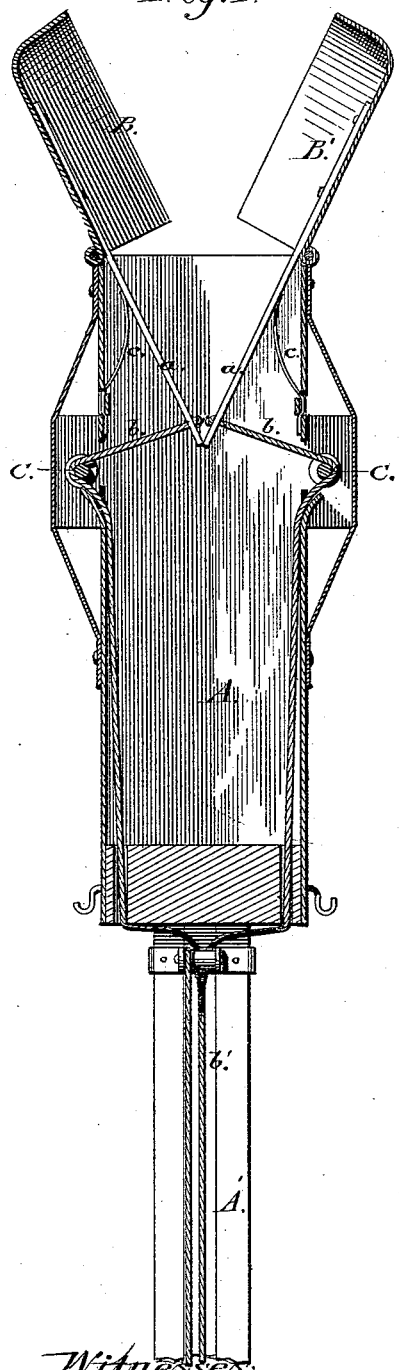
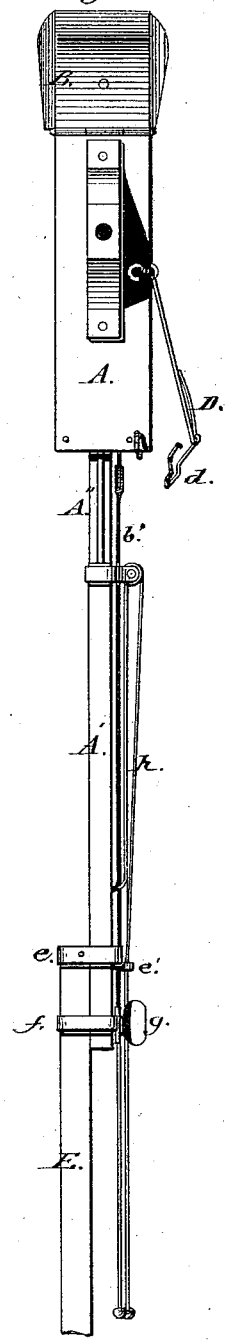

UNITED STATES PATENT OFFICE.

IRA GOTHARD, OF BAINBRIDGE, KENTUCKY.

IMPROVEMENT IN FRUIT-PICKERS.

Specification forming part of Letters Patent No. 208,167, dated September 17, 1878; application filed May 14, 1878.

*To all whom it may concern:*

Be it known that I, IRA GOTHARD, of Bainbridge, in the county of Christian and State of Kentucky, have invented certain new and useful Improvements in Fruit-Pickers; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1 represents a longitudinal section of my complete invention, and Fig. 2 a front elevation.

Similar letters of reference denote like parts in both figures.

My invention has for its object to provide an improved fruit-picker, whereby fruit may be detached from the tree and lodged in a receptacle, without liability of being bruised or injured, in a rapid and easy manner; and the invention consists of a rectangular or other suitably-shaped receptacle, arranged upon an extension-shaft, and having an open mouth provided with hinged jaws, operated by a single cord, said receptacle being provided with a spring lid or door to discharge the gathered fruit when full.

It further consists of an extension shaft or handle, capable of being extended or contracted, so as to gather the fruit from upper and lower limbs without changing the position of the operator, all as will be hereinafter more fully described, and pointed out in the claims.

Referring to the drawings, A represents the rectangular or other suitably-shaped receptacle, attached to the upper part of the sliding rod $A^2$ of the extension-shaft, and having an open mouth, provided with hinged jaws B B', said jaws having lugs $a$, which project down into the receptacle A, to which are attached cords $b\ b$, which pass from the lugs through the sides of the receptacle and over the rollers C, and from thence down through the bottom of said receptacle, where they are connected to a single cord, $b'$. A flat spring, $c$, is arranged on the inner walls of the receptacle behind the lugs $a$, and, pressing against the same, serves to keep the jaws B B' thrown open. By pulling the cord $b'$, which in turn operates the cords $b\ b$ on the lugs $a$, the jaws B B' are closed tight, and by releasing the cord $b'$ the springs $c$ serve to throw open the jaws again, the edges of said jaws being made sharp, or with a knife-edge, to readily cut the stems of the fruit to be picked to detach it from the branch of the tree. At the lower part of the receptacle, and upon one side thereof, is provided a hinged door, D, having a spring-catch, $d$, the object of which is to discharge the contents of the receptacle into suitable fruit-baskets placed on the ground. The extension-shaft is composed of the handle E and sliding rods $A^1\ A^2$, a fixed sleeve, $e$, being attached to the upper end of the handle E, through which the rod $A^1$ slides, which has also a fixed sleeve, $f$, at its bottom, which slides on the handle E, and is provided with a set-screw, $g$, for fastening the rod A upon the handle E at any desired height. The rod $A^2$, to the upper part of which is attached the receptacle A, slides in groove cut through the center of the rod $A^1$, and is elevated by a cord, $h$, which is secured to the bottom of the rod $A^2$ and passing upward, turns over a roller, $C'$, attached to a fixed sleeve on the upper end of the rod $A^1$, and passes from thence down to the fixed sleeve $e$, on the upper part of the handle E, where it passes through an opening in the lug $e'$ on said sleeve, and provided on the end with a handle. By pulling upon this cord $h$, the rod $A^2$ travels upward in the groove in the rod $A^1$, thereby elevating the receptacle to the desired height. By releasing the strain upon the cord the weight of the receptacle causes the rod $A^2$ to run down into the groove, thereby diminishing the length of the extension-shaft. The cord $b'$, which operates the jaws B B', also passes down through an opening in the lug $e'$ on the fixed sleeve $e$ of the handle E, where it is provided with a suitable knob or handle.

The construction of my invention being as described, it will be observed that in the operation of the same the receptacle A is extended up into the lower branches of the tree, and the fruit gathered by operating the jaws B B', by means of the cord $b'$, and when the receptacle is full it is lowered, and its contents emptied through the door D into baskets or other suitable receptacles. The picker can now be carried up to the higher limbs without changing the position, by simply pulling the cord $h$, which pushes the rod $A^2$ up in the groove of the rod $A'$.

By means of my improvements I am enabled to gather or pick fruit without injuring or bruising the same, by allowing it to drop into the receptacle A.

I am aware that fruit-pickers having hinged jaws for gathering the fruit have been heretofore known, and I do not therefore desire to claim such a construction, broadly; but What I do claim as new and useful is—

1. As an improved article of manufacture, the herein-described fruit-picker, consisting of the jaws B B', hinged or pivoted in the upper part of the receptacle A, and having downwardly-projecting lugs $a$, operated by springs $c$ and cords $b$ $b$ and $b'$, said receptacle A, having door D at its base, being attached to the top of sliding rod $A^2$, which moves in rod $A^1$ of the handle E, and operated by cord $h$, substantially in the manner and for the purpose specified.

2. In a fruit-picker, the extension-shaft formed of the handle E, having fixed sleeve $e$, and rods $A^1$ $A^2$, said rod $A^2$ being operated by the cord $h'$, in combination with the receptacle A, substantially as and for the purpose specified.

In testimony that I claim the foregoing as my own invention I affix my signature in presence of two witnesses.

IRA GOTHARD.

Witnesses:
GEORGE BYRON BINGHAM,
WILLIAM ROBERT WOLF.